(12) United States Patent
Narumi

(10) Patent No.: US 8,240,897 B2
(45) Date of Patent: Aug. 14, 2012

(54) OPTICAL AXIS ADJUSTING APPARATUS AND VEHICLE LIGHT INCLUDING THE SAME

(75) Inventor: Yoshitaka Narumi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 670 days.

(21) Appl. No.: 12/327,968

(22) Filed: Dec. 4, 2008

(65) Prior Publication Data

US 2009/0161380 A1 Jun. 25, 2009

(30) Foreign Application Priority Data

Dec. 4, 2007 (JP) ................. 2007-314073

(51) Int. Cl.
*F21S 8/10* (2006.01)
*F21V 14/04* (2006.01)

(52) U.S. Cl. ........ 362/515; 362/528; 362/282; 362/514; 362/512

(58) Field of Classification Search .................. 362/512, 362/514, 515, 528, 272, 282, 284
See application file for complete search history.

(56) References Cited

U.S. PATENT DOCUMENTS

| | | | | |
|---|---|---|---|---|
| 1,276,791 A * | 8/1918 | Mayer | | 362/512 |
| 2,137,092 A * | 11/1938 | Michel et al. | | 362/324 |
| 4,574,334 A * | 3/1986 | Igura | | 362/515 |
| 4,936,670 A * | 6/1990 | Yoo | | 359/841 |
| 5,207,473 A * | 5/1993 | Nawa et al. | | 248/430 |
| 6,234,655 B1 * | 5/2001 | Suehiro et al. | | 362/515 |
| 6,276,808 B1 * | 8/2001 | Foote et al. | | 359/877 |
| 6,543,916 B2 * | 4/2003 | Shirai | | 362/460 |
| 6,582,087 B2 * | 6/2003 | Whitehead et al. | | 359/841 |
| 6,910,789 B2 * | 6/2005 | Tanaka et al. | | 362/514 |
| 7,070,287 B2 * | 7/2006 | Foote et al. | | 359/841 |
| 2009/0070794 A1 * | 3/2009 | Hashimoto et al. | | 720/658 |
| 2011/0061482 A1 * | 3/2011 | Maruyama et al. | | 74/89.23 |

FOREIGN PATENT DOCUMENTS

JP 01018739 A * 1/1989
JP 2003187610 7/2003

* cited by examiner

*Primary Examiner* — Ismael Negron

(74) *Attorney, Agent, or Firm* — Kenealy Vaidya LLP

(57) ABSTRACT

An optical axis adjusting apparatus and vehicle light include a lamp housing and a reflector. The optical axis adjusting apparatus includes a ball joint via which the lamp housing and the reflector are connected, an aiming screw, a nut portion, and a support member. The nut portion is screwed onto the aiming screw and the support member is fit onto the aiming screw.

11 Claims, 10 Drawing Sheets

US 8,240,897 B2

OPTICAL AXIS ADJUSTING APPARATUS AND VEHICLE LIGHT INCLUDING THE SAME

This application claims the priority benefit under 35 U.S.C. §119 of Japanese Patent Application No. 2007-314073 filed on Dec. 4, 2007, which is hereby incorporated in its entirety by reference.

BACKGROUND ART

1. Technical Field

The presently disclosed subject matter relates to a vehicle light, and in particular, to an optical axis adjusting apparatus for use in a vehicle light. The optical axis adjusting apparatus can be configured to reduce the load on the vibrating vehicle body.

2. Description of the Related Art

Conventional optical axis adjusting apparatuses have been known, and one example of which is disclosed in FIG. 1 of Japanese Patent Application Laid-Open No. 2003-187610 (hereinafter, referred to as "the conventional optical axis adjusting apparatus).

FIGS. 1 and 2 show schematic vertical cross-sectional views of the conventional optical axis adjusting apparatus corresponding to FIG. 1 of Japanese Patent Application Laid-Open No. 2003-187610. The conventional optical axis adjusting apparatus is used for a vehicle headlight 910 that includes a lamp housing 911 and a reflector 915, and is configured to include a ball joint 920 via which the lamp housing 911 and the reflector 915 are connected. An aiming screw 911a with root portion 911a1 is supported by the lamp housing 911 so as to freely turn and allows the reflector 915 to rotate with respect to the lamp housing 911 around the ball joint 920. A nut portion 915a is provided on the reflector 915 and can be screwed onto the aiming screw 911a.

In FIGS. 1 and 2, the reference numeral 912 denotes an outer lens, 913 denotes a socket, and 914 denotes a light source, such as a bulb. Reference 915b denotes a bent portion of the reflector 915, reference 915c denotes an area near the nut portion 915a of the reflector 915, and reference 915d denotes a main body of the reflector 915. In addition, reference 911a2 denotes a tip portion of the aiming screw 911a which is positioned opposite to the root portion 911a1 via the nut portion 915a.

The conventional optical axis adjusting apparatus for vehicle headlight 910 can be operated as follows. As shown in FIG. 1, the aiming screw 911a can be turned so that the optical axis of the vehicle headlight 910 is adjusted to be lowered. Then, the nut portion 915a of the reflector 915 can move as shown by the arrow A in FIG. 1. Namely, the nut portion 915a is forced to linearly move rearward (to the right side of FIG. 1) along the center axis (along a right-to-left direction in FIG. 1) of the aiming screw 911a as the aiming screw 911a is turned.

In this case, the upper portion of the reflector 915 is pivoted by the ball joint 920, and the area supported by the ball joint 920 can be rotated around the ball joint 920. Accordingly, in reality, the nut portion 915a of the reflector 915 is regulated to move along the arrow B of FIG. 1 in a circular clockwise direction around the ball joint 920 which serves as a center of the circular direction.

In this instance, since the root portion 911a1 of the aiming screw 911a is fixed to the housing 911, a force shown by the arrow C in FIG. 1 is applied to the aiming screw 911a so that the tip portion 911a2 of the aiming screw 911a rotates around the root portion 911a1 which acts as a center in a clockwise direction while a counter force is applied to the reflector 915 in a reverse fashion.

Consider the case in which the aiming screw 911a can be turned so that the optical axis of the vehicle headlight 910 is adjusted so as to be lifted. In this case, the nut portion 915a of the reflector 915 can move as shown by the arrow A in FIG. 2. Namely, the nut portion 915a is forced to linearly move frontward (to the left side of FIG. 2) along the center axis of the aiming screw 911a as the aiming screw 911a is turned.

As described above, in reality, the reflector 915 including the nut portion 915a is regulated to move along the arrow B of FIG. 2 in a circular counterclockwise direction around the ball joint 920 which serves as a center.

In this instance, a force shown by the arrow C in FIG. 2 is applied to the aiming screw 911a so that the tip portion 911a2 of the aiming screw 911a rotates around the root portion 911a1 which acts as a center in a counter-clockwise direction while a counter force is applied to the reflector 915 in a reverse fashion.

In order to release or relax the forces applied to the aiming screw 911a and the reflector 915, as shown in FIGS. 1 and 2, the conventional optical axis adjusting apparatus can be provided with the bent portion 915b.

Furthermore, as shown in FIGS. 1 and 2, the root portion 911a1 of the aiming screw 911a is constrained by the lamp housing 911 and the tip portion 911a2 is not constrained by the lamp housing 911. In other words, the aiming screw 911a is supported by the lamp housing 911 in a cantilever fashion.

In recent years, as the projector type vehicle headlight design has become popular, the unit that is to be rotated around such a ball joint with respect to a lamp housing has a tendency to increase in weight (see, for example, the vehicle headlight as shown in FIG. 1 of Japanese Patent Application Laid-Open No. 2002-83508).

On the other hand, recent vehicle headlights may include what is known as an Adaptive Front Lighting System (AFS) and can be provided with a swing mechanism such as a swivel motor in order to achieve the AFS function. This configuration also increases the weight of the unit that is to be rotated (see, for example, the vehicle headlight as shown in FIG. 8 of Japanese Patent Application Laid-Open No. 2007-179915).

Accordingly, the structure of the aiming screw which is supported by the lamp housing in a cantilever fashion and the nut portion of the reflector that is to be screwed onto the aiming screw also have a tendency to increase the load these elements should bear.

In FIGS. 1 and 2, if the aiming screw 911a and the nut portion 915a of the reflector were to be arranged within a vertical plane including the ball joint 920, in this case, the unit to be rotated with respect to the lamp housing 911, or the reflector 915, can be supported mainly by the ball joint 920 (among the ball joint 920, the aiming screw 911a and the nut portion 915a of the reflector 915). Accordingly, the load the aiming screw 911a and the nut portion 915a should bear does not become so large. On the contrary, when the aiming screw 911a and the nut portion 915a are arranged outside a vertical plane including the position of the ball joint 920, the load the aiming screw 911a and the nut portion 915a should bear may become large.

FIGS. 3A and 3B show the diagrams corresponding to FIG. 8 of Japanese Patent Application Laid-Open No. 2001-151011. Specifically, FIG. 3A is a schematic horizontal cross-sectional view of another conventional vehicle headlight 910 taken along line A-A of FIG. 3B. FIG. 3B is a front view of the vehicle headlight of FIG. 3A.

In this conventional vehicle headlight 910, the optical axis adjusting apparatus is configured so that an aiming screw 911b is turned in one direction for optical axis adjustment. Then, a nut portion 915e of the reflector 915 is moved forward (to the lower side of FIG. 3A) along the center axis of the aiming screw 911b (in the upper-to-lower direction in FIG. 3A) with respect to the aiming screw 911b. As a result, the reflector 915 itself can rotate around the ball joint 920 which serves as a center with respect to rotation of the lamp housing 911 in a clockwise direction as shown in FIG. 3B. Accordingly, the optical axis of the vehicle headlight 910 can be adjusted leftward in FIG. 3A.

On the other hand, when the aiming screw 911b is turned in the other direction for optical axis adjustment, the nut portion 915e of the reflector 915 is moved rearward (to the upper side of FIG. 3A) along the center axis of the aiming screw 911b with respect to the aiming screw 911b. As a result, the reflector 915 itself can rotate around the ball joint 920 which serves as a center with respect to rotation of the lamp housing 911 in a counter-clockwise direction as shown in FIG. 3A. Accordingly, the optical axis of the vehicle headlight 910 can be adjusted rightward in FIG. 3A.

In this conventional vehicle headlight, as shown in FIGS. 3A and 3B, the aiming screw 911b and the nut portion 915e of the reflector 915 are arranged outside a vertical plane that includes the position of the ball joint 920. As described above, when the vehicle headlight 910 is configured to have a projector type structure or is provided with a swing mechanism such as a swivel motor in order to add the AFS function to the reflector 915, the load that the aiming screw 911b which is supported by the lamp housing 911 in a cantilever fashion and the nut portion 915e of the reflector 915 should bear can become excessively large.

SUMMARY

The presently disclosed subject matter was devised in view of these and other characteristics, problems, and features associated with the conventional art. According to an aspect of the presently disclosed subject matter, an optical axis adjusting apparatus for use in a vehicle light can be configured to reduce the load that an aiming screw supported by a lamp housing and a nut portion to be screwed on the aiming screw should bear (for example, a load when applied during the vibration of the vehicle body).

According to another aspect of the presently disclosed subject matter, an optical axis adjusting apparatus can be configured for use in a vehicle light including a lamp housing and a reflector, and can include: a ball joint via which the lamp housing and the reflector are connected; an aiming screw configured to allow the reflector to rotate with respect to the lamp housing around the ball joint and having a root portion and a tip portion with the root portion being supported by the lamp housing so as to be freely turned; a nut portion configured to be provided with the reflector and to be screwed onto the aiming screw; and a support member configured to support the tip portion of the aiming screw positioned opposite to the root portion via the nut portion so that the tip portion can be rotated. This configuration can be achieved, after the nut portion is screwed onto the aiming screw and the support member is fit to the tip portion of the aiming screw, and the support member is attached to the lamp housing.

In the optical axis adjusting apparatus configured as described above, the lamp housing and the support member may be configured as separate members.

In the optical axis adjusting apparatus configured as described above, the tip portion of the aiming screw can have a non-screw portion having a substantially cylindrical shape, and the support member can have a fit hole of a substantially cylindrical shape to be fit with the cylindrical non-screw portion of the tip portion of the aiming screw so that a sliding fit between the non-screw portion of the tip portion of the aiming screw and the fit hole of the support member is achieved.

Alternatively, the tip portion of the aiming screw can have a spherical portion having a substantially spherical shape, and the support member can have a fit hole of a complementary shape corresponding to the spherical portion of the tip portion of the aiming screw, to be fit with the spherical portion so that a sliding fit between the spherical portion of the tip portion of the aiming screw and the fit hole of the support member is achieved by press fitting the spherical portion into the fit hole.

In the optical axis adjusting apparatus configured as described above, the aiming screw may be positioned outside a vertical plane in which the ball joint is positioned.

The vehicle light can be configured as a vehicle headlight having an adjustable optical axis.

The optical axis adjusting apparatus for use in a vehicle light can include the support member configured to support the tip portion of the aiming screw positioned opposite to the root portion of the aiming screw via the nut portion so that the tip portion can be rotated. Namely, this configuration can be achieved, after the nut portion is screwed onto the aiming screw and then the support member is fit to the tip portion of the aiming screw, the support member is attached to the lamp housing.

In the conventional optical axis adjusting apparatus, the tip portion of the aiming screw is not supported, and the root portion thereof is supported only by the lamp housing in a cantilever fashion. However, the optical axis adjusting apparatus of the disclosed subject matter can be configured such that the tip portion of the aiming screw is also supported by the support member. Accordingly, the load that the aiming screw supported by the lamp housing and the nut portion of the reflector should bear can be reduced (for example, a load applied during vibration of the vehicle body can be reduced or limited).

When a lamp housing is formed by molding a material, the lamp housing and the support member can be formed as a single unit. However, in this case, part of the unit of the lamp housing and the support member may have an undercut structure, which may make the structure of a metal mold relatively complex. Accordingly, the lamp housing and the support member can be formed as separate members to avoid this possible drawback.

In an example of an optical axis adjusting apparatus made in accordance with principles of the presently disclosed subject matter, a sliding fit between the cylindrical non-screw portion of the tip portion of the aiming screw and the fit hole of the support member can be achieved. In this case, when compared with the case where the support member has a non-cylindrical hole formed therein, the support member can be easily formed.

Alternatively, a sliding fit between a spherical portion of the tip portion of the aiming screw and the fit hole of the support member can be achieved by press fitting the spherical portion into the fit hole. In this case, the spherical portion of the tip portion of the aiming screw can be slidably movable within the fit hole while also preventing disengagement therefrom. The force from the nut portion of the reflector may be applied to the aiming screw rearward in a center axis direction thereof. The configuration of the support member as described immediately above can prevent the aiming screw from coming off from the lamp housing. Accordingly, an independent mechanism for preventing the aiming screw from coming off is not required.

In general, when the aiming screw and the nut member are arranged within a vertical plane in which the ball joint is positioned, the load that the aiming screw and the nut portion should bear is relatively low because the ball joint can mainly bear the load. However, when the other components are positioned outside the vertical plane in which the ball joint is positioned, the load that the aiming screw and the nut portion should bear may become large. In view of this, in the optical axis adjusting apparatus configured as described above, even when the aiming screw is positioned outside a vertical plane in which the ball joint is positioned, the tip portion of the aiming screw can be supported by the support member. This means the load that the aiming screw and the nut member of the reflector should bear can be reduced.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

A description will now be made below of examples of optical axis adjusting apparatuses made in accordance with principles of the presently disclosed subject matter and with reference to the accompanying drawings.

Figure 1:
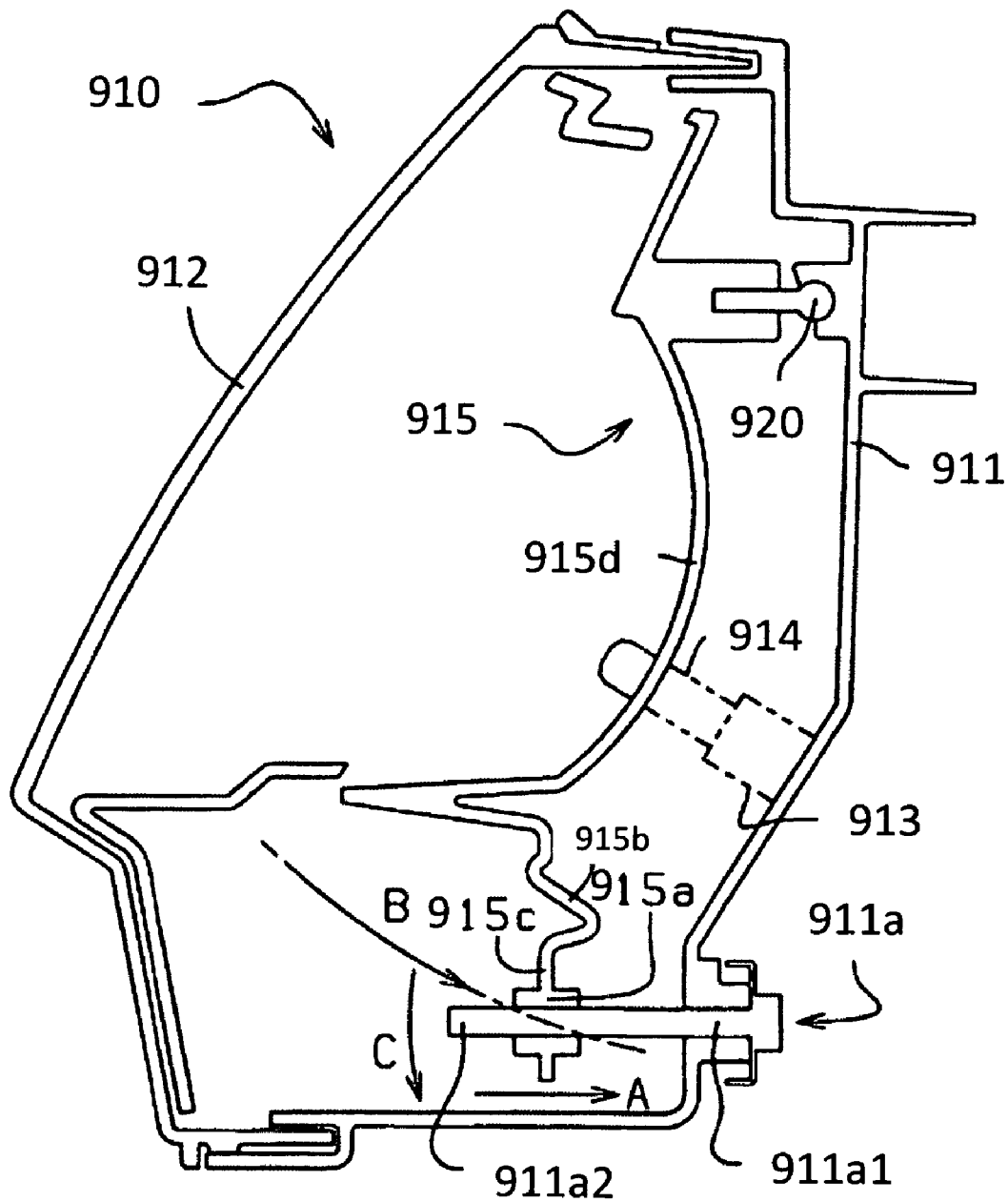
FIG. 1 is a schematic vertical cross-sectional view of an optical axis adjusting apparatus for use in a vehicle headlight according to conventional technology.
Figure 2:
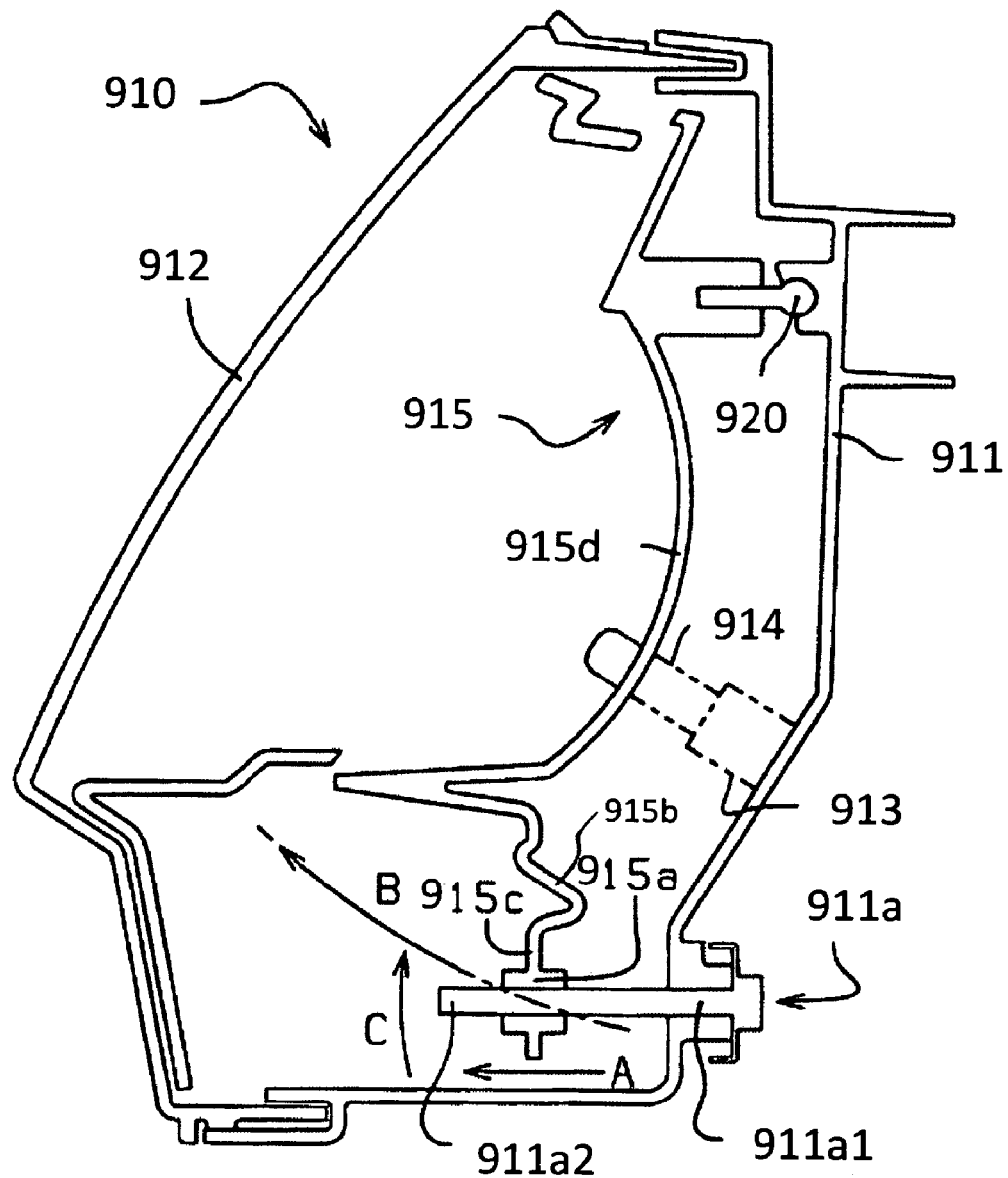
FIG. 2 is another schematic vertical cross-sectional view of the optical axis adjusting apparatus of FIG. 1.
Figure 3A:
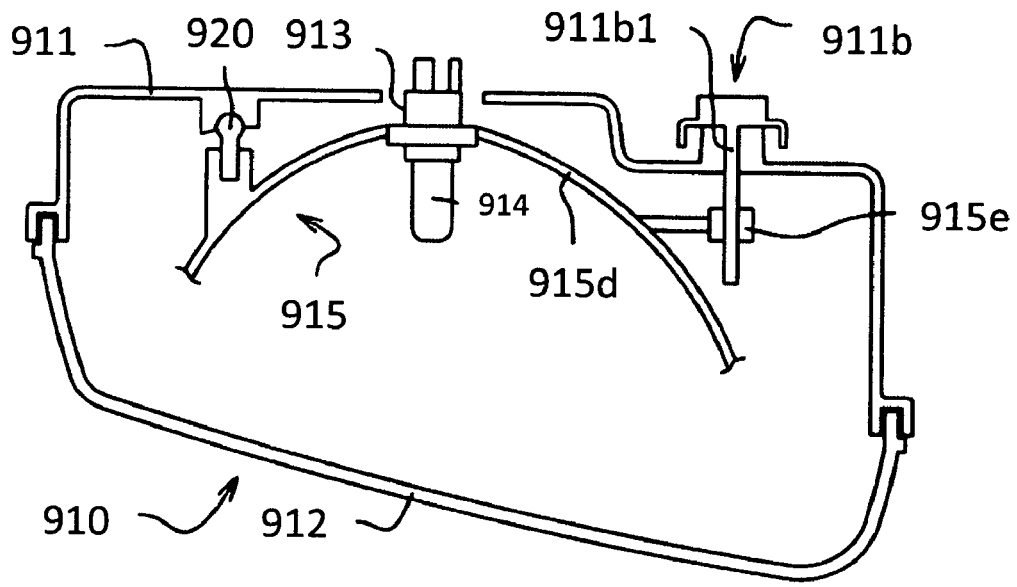
FIG. 3A is a schematic horizontal cross-sectional view of another conventional vehicle headlight according to conventional technology taken along line A-A of FIG. 3B.
Figure 3B:
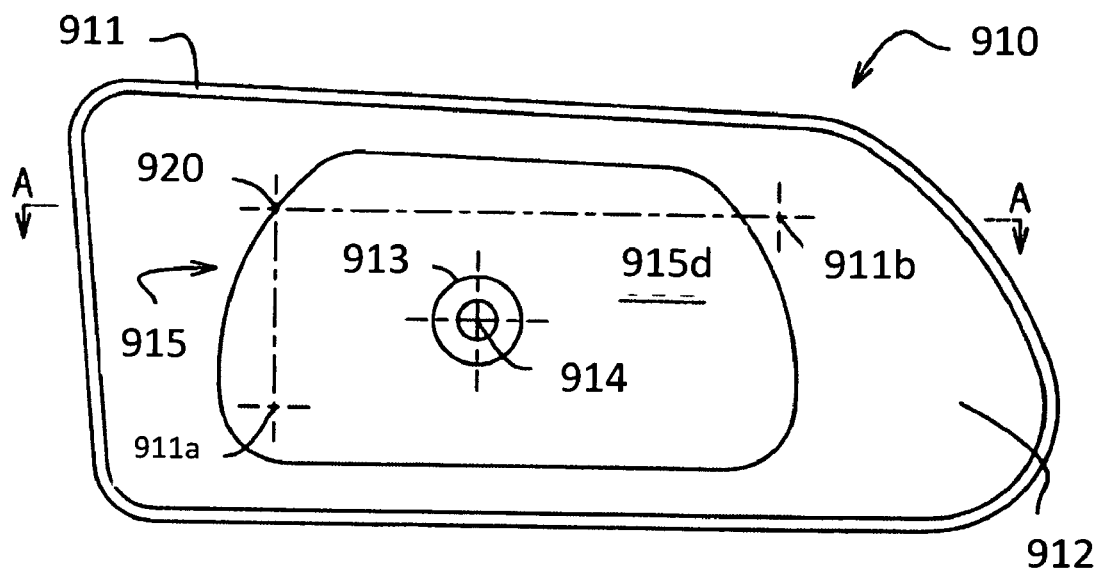
FIG. 3B is a front view of the lamp of FIG. 3A.
Figure 4A:
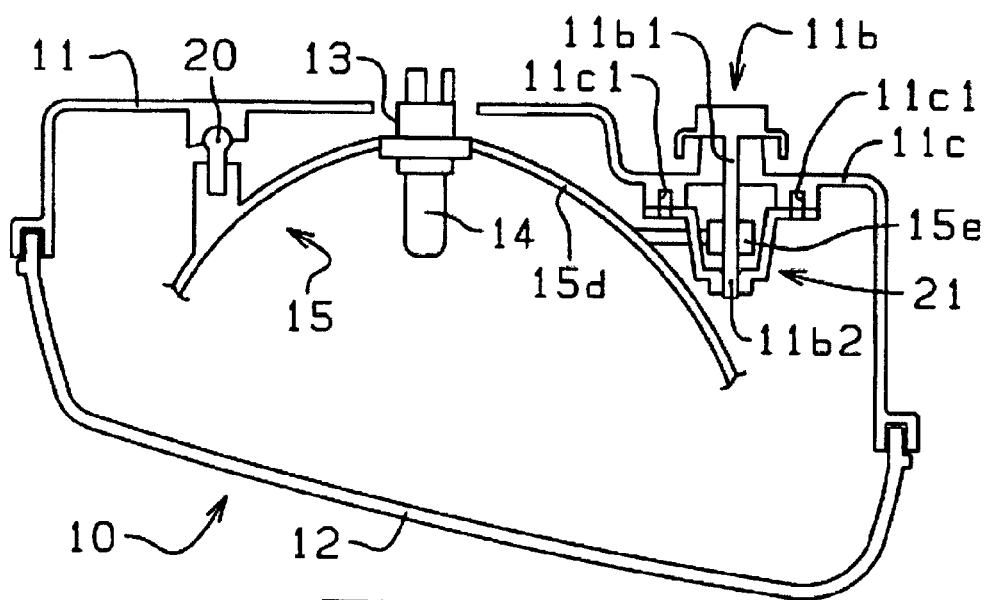
FIGS. 4A and 4B show a first exemplary embodiment of a vehicle headlight including an optical axis adjusting apparatus made in accordance with principles of the presently disclosed subject matter, with FIG. 4A being a schematic horizontal cross-sectional of the vehicle headlight taken along line A-A of FIG. 4B, and FIG. 4B being a front view of the vehicle headlight.
Figure 4B:
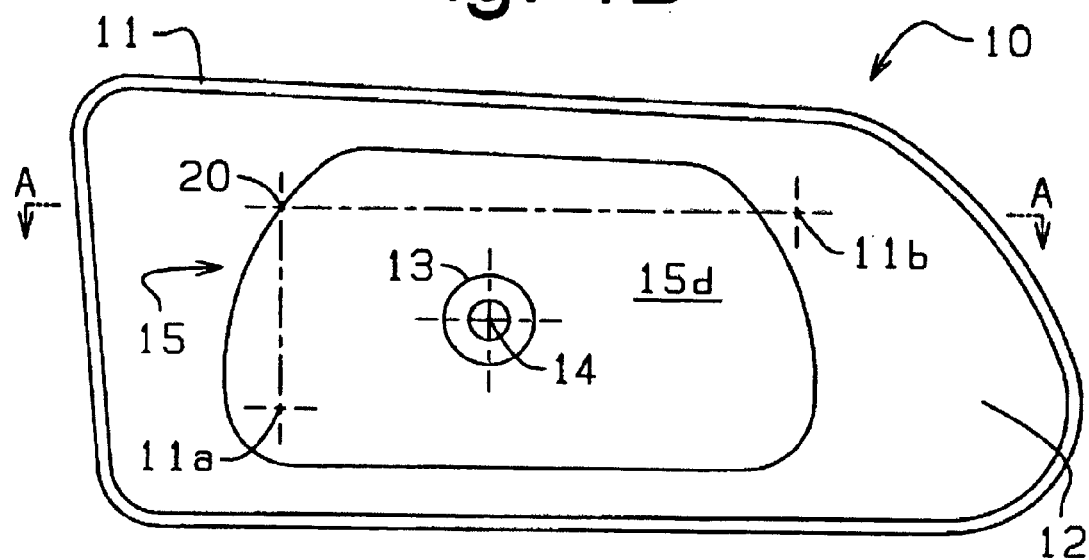

FIGS. 4A and 4B show a first exemplary embodiment of a vehicle headlight 10 including an optical axis adjusting apparatus made in accordance with principles of the presently disclosed subject matter. FIG. 4A is a schematic horizontal cross-sectional view of the vehicle headlight 10 taken along line A-A of FIG. 4B, and FIG. 4B is a front view of the headlight 10.

The vehicle headlight 10 can include a lamp housing 11 and a reflector 15, and can be configured to include a ball joint 20 via which the lamp housing 11 and the reflector 15 are connected. Furthermore, an aiming screw 11b can be provided which can allow the reflector 15 to rotate with respect to the lamp housing 11 and around the ball joint 20. A root portion 11b1 of the aiming screw 11b can be supported by the lamp housing 11 so as to freely turn. A nut portion 15e which can be screwed onto the aiming screw 11b can be provided on or attached to the reflector 15.

In the optical axis adjusting apparatus of the first exemplary embodiment, the aiming screw 11b can be turned in one direction to adjust the optical axis of the vehicle headlight 10. In this case, the nut portion 15e of the reflector 15 can move forward (to the lower side of FIG. 4A) along the center axis (along the upper-to-lower direction in FIG. 4A) of the aiming screw 11b and with respect to the aiming screw 11b. As a result, the reflector 15 itself can rotate in the clockwise direction around the ball joint 20 which serves as a center of rotation for the reflector 15 with respect to the lamp housing 11. Accordingly, the optical axis of the vehicle headlight 10 can be moved leftward as shown in FIG. 4A.

Alternatively, the aiming screw 11b can be turned in the other direction to adjust the vehicle headlight 10. In this case, the nut portion 15e of the reflector 15 can move backward (to the upper side of FIG. 4A) along the center axis of the aiming screw 11b and with respect to the aiming screw 11b. As a result, the reflector 15 itself can rotate in the counter-clockwise direction around the ball joint 20 which serves as a center of rotation for the reflector 15 with respect to the lamp housing 11. Accordingly, the optical axis of the vehicle headlight 10 can be moved rightward as shown in FIG. 4A.

In the exemplary embodiment illustrated in FIG. 4B, another aiming screw 11a and another nut portion 15a of the reflector 15 are provided just vertically below the ball joint 20. Accordingly, by turning the aiming screw 11a vertical aiming of the optical axis of the vehicle headlight 10 can be achieved. It should be noted that the mechanism and operation thereof can be substantially the same as those in the case of horizontal direction adjustment, and the description thereof is omitted here.

The optical axis adjusting apparatus of the first exemplary embodiment can further include a support member 21 configured to support the tip portion 11b2 of the aiming screw 11b positioned opposite to the root portion 11b1 (lower side of FIG. 4A) via the nut portion 15e as shown in FIG. 4A, so that the tip portion can be rotated.

Specifically, in this embodiment, after the nut portion 15e is screwed onto the aiming screw 11b, the support member 21 is then secured to the tip portion 11b2 of the aiming screw 11b, and the support member 21 is attached to the lamp housing 11.

Figure 5A:
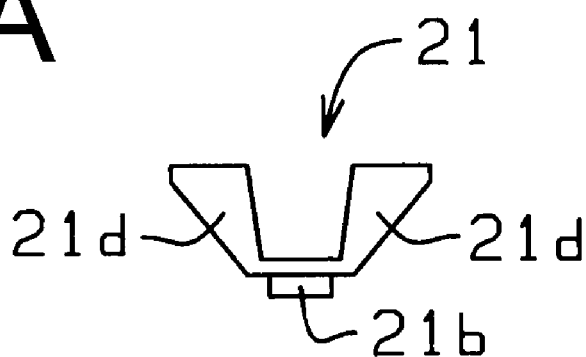
FIGS. 5A, 5B, and 5C show a support member for use in the optical axis adjusting apparatus of FIG. 4B, FIG. 5A being a plan view thereof, FIG. 5B being a front view thereof, and FIG. 5C being a cross-sectional view taken along line B-B of FIG. 5B.
Figure 5B:
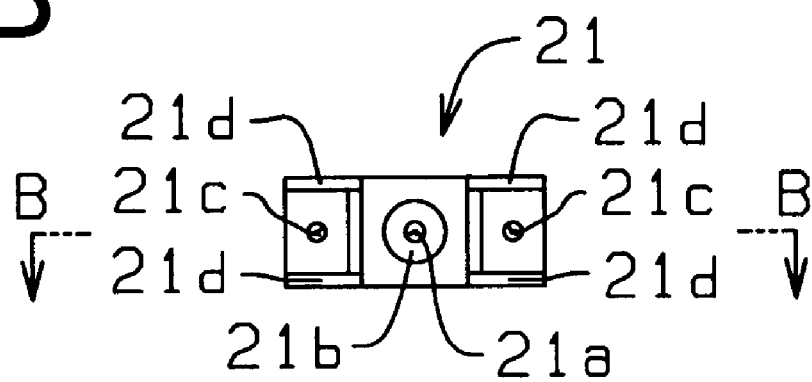
Figure 5C:
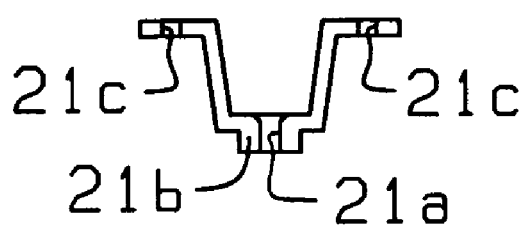
Figure 6:
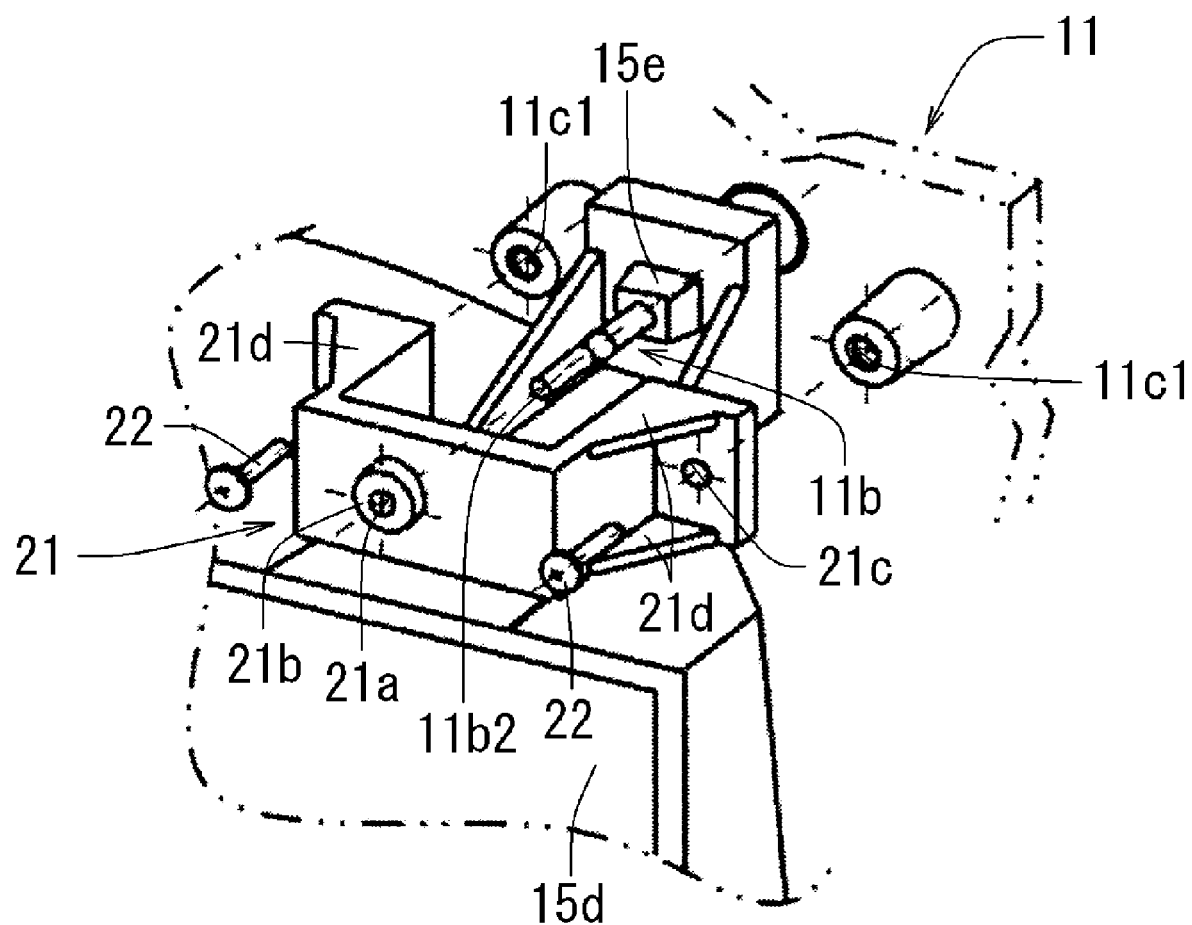
FIG. 6 is an exploded partial perspective view showing the lamp housing, the reflector, and the support member of FIG. 4A.

FIGS. 5A, 5B, and 5C show the support member 21 illustrated in FIG. 4A. Specifically, FIG. 5A is a plan view of the support member 21, FIG. 5B is a front view thereof, and FIG. 5C is a cross-sectional view taken along line B-B of FIG. 5B. Furthermore, FIG. 6 is an exploded partial perspective view of the lamp housing 11, the reflector 15, and the support member 21.

The optical axis adjusting apparatus of the first exemplary embodiment can include the lamp housing 11 and the support member 21 provided as separate members. The tip portion 11b2 of the aiming screw 11b has a non-screw (non-tapped) portion having a substantially cylindrical shape. Accordingly, the support member 21 can include a fit hole 21a having a substantially cylindrical shape that is configured to be fit with the cylindrical non-screw portion of the tip portion 11b2 of the aiming screw 11b so that a sliding fit between the non-screw portion of the tip portion 11b2 of the aiming screw 11b and the fit hole 21a of the support member 21 is achieved.

The support member 21 can have a boss portion 21b in order to secure a fit margin for the fit between the non-screw portion of the tip portion 11b2 of the aiming screw 11b and the fit hole 21a of the support member 21. The support member 21 can include screw holes 21c via which screws 22 can be inserted into female screw parts 11c1 on the rear wall 11c of the lamp housing 11 in order to fix the support member 21 to the lamp housing 11. To enhance its rigidity, the support member 21 can have reinforcing ribs 21d as shown in FIGS. 5A and 5B.

In the optical axis adjusting apparatus of the first exemplary embodiment, as shown in FIG. 4A, the main body 15d and the nut portion 15e of the reflector 15 are formed as a single part, but the presently disclosed subject matter is not limited thereto. Alternatively, the main body 15d and the nut portion 15e of the reflector 15 can be formed as separate members so as to be assembled as a single unit afterwards.

In the optical axis adjusting apparatus of the first exemplary embodiment, the support member 21 can be formed of general-purpose materials which are used for forming vehicle components, such as resin materials, metal materials, and the like.

In the optical axis adjusting apparatus of the first exemplary embodiment, as shown in FIGS. 4A to 6, the support member 21 is secured via screws at two portions to the lamp housing 11. However the presently disclosed subject matter is not limited thereto. For example, the support member 21 can be secured via screws or other attachment structures or means at three or more portions to the lamp housing 11. Furthermore, the support member 21 can be fixed to the lamp housing 11 by other means such as rivets, clamps, adhesives, welding, and the like.

In the optical axis adjusting apparatus of the first exemplary embodiment, the tip portion 11b2 of the aiming screw 11b is positioned outside a vertical plane in which the ball joint 20 is positioned, and is supported by the support member 21. At the same time the tip portion 11a2 of the aiming screw 11a just below the ball joint 20 may use the same type support member (accordingly, the drawings and the description thereof are omitted). For example, when an optical axis adjusting apparatus is applied to a small-sized vehicle headlight such as a fog lamp or the like, the support member for supporting the tip portion 11b2 of the aiming screw 11b and that for supporting the tip portion 11a2 of the aiming screw 11a can be formed as a single part.

Figure 7A:
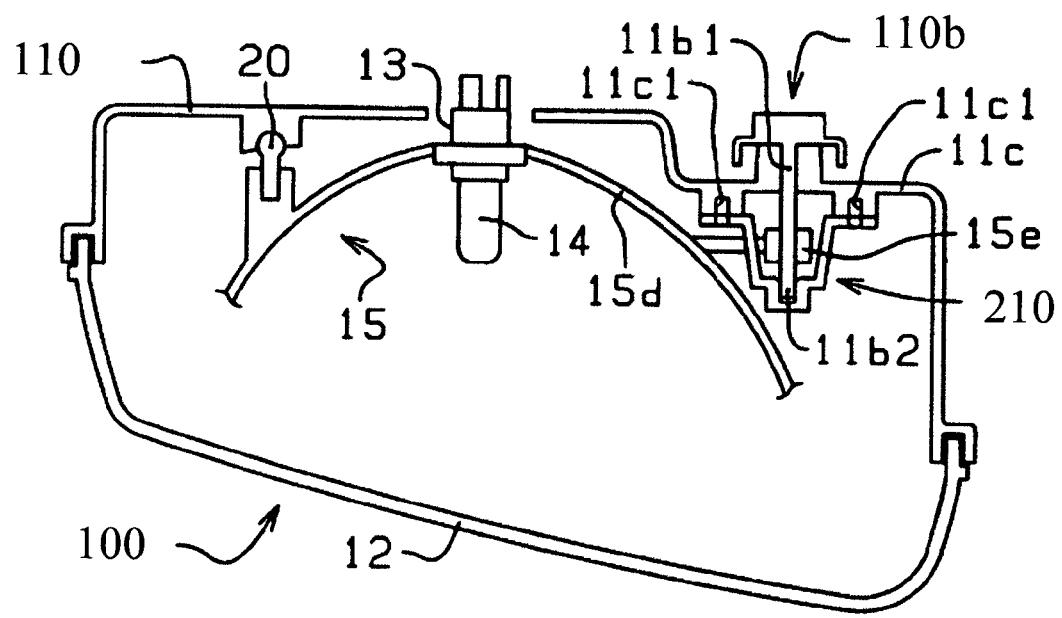
FIGS. 7A and 7B show a second exemplary embodiment of a vehicle headlight including an optical axis adjusting apparatus made in accordance with principles of the presently disclosed subject matter, FIG. 7A being a schematic horizontal cross-sectional view of the vehicle headlight taken along line A-A of FIG. 7B, and FIG. 7B being a front view thereof.
Figure 7B:
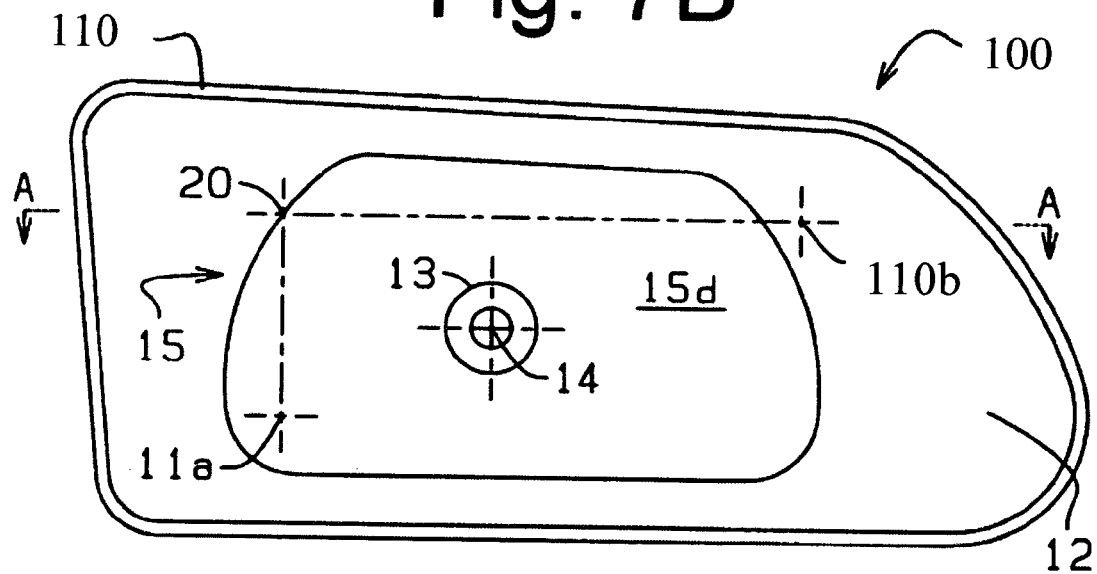
Figure 8A:
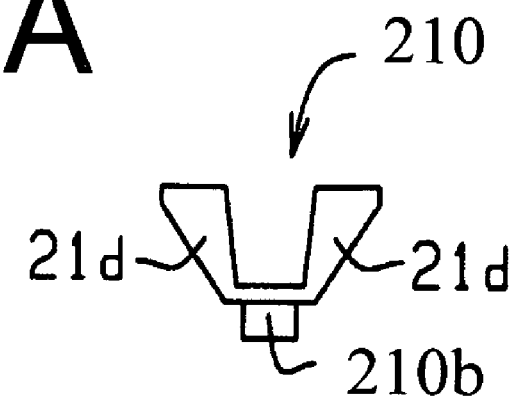
FIGS. 8A, 8B, and 8C show a support member for use in the optical axis adjusting apparatus of FIG. 7B, FIG. 8A being a plan view thereof, FIG. 8B being a front view thereof, and FIG. 8C being a cross-sectional view taken along line B-B of FIG. 8B.
Figure 8B:
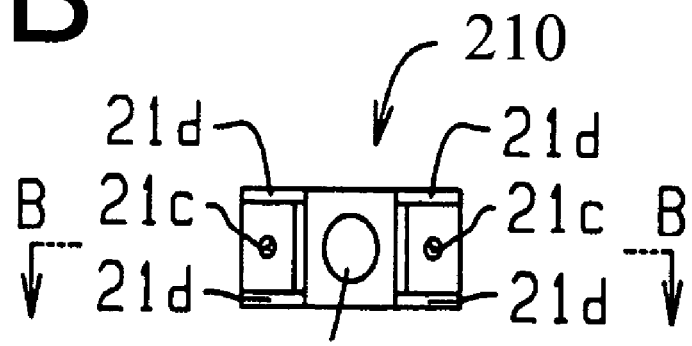
Figure 8C:
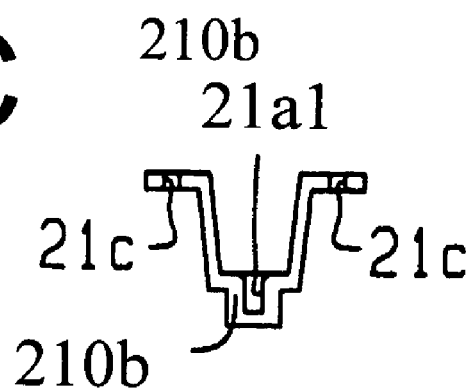

FIGS. 7A and 7B show a vehicle headlight 100 to which an optical axis adjusting apparatus according to a second exemplary embodiment of the presently disclosed subject matter is applied. Specifically, FIG. 7A is a schematic horizontal cross-sectional view of the vehicle headlight taken along line A-A of FIG. 7B, and FIG. 7B is a front view of the vehicle headlight including lamp housing 110. FIGS. 8A, 8B, and 8C show a support member for use in the optical axis adjusting apparatus of FIG. 7B. Specifically, FIG. 8A is a plan view thereof, FIG. 8B is a front view thereof, and FIG. 8C is a cross-sectional view taken along the line B-B of FIG. 8B.

In the optical axis adjusting apparatus of the first exemplary embodiment, as shown in FIGS. 4A to 6, the fit hole 21a of the support member 21 is formed as a through hole. By contrast, the optical axis adjusting apparatus of the second exemplary embodiment can include a fit hole 21a1 in boss 210b of non-through hole type located on the support member 210. Other structural configurations, and the operation and the effect of thereof can be the same as those in the first exemplary embodiment, and accordingly, a detailed description thereof is omitted here.

Figure 9A:
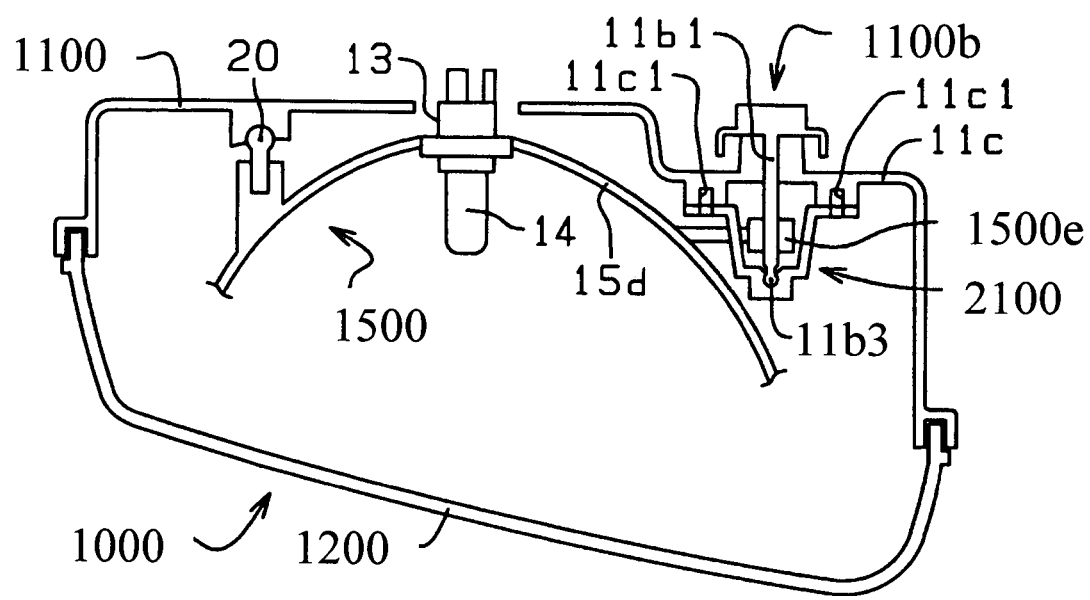
FIGS. 9A and 9B show a third exemplary embodiment of a vehicle headlight including an optical axis adjusting apparatus made in accordance with principles of the presently disclosed subject matter, with FIG. 9A being a schematic horizontal cross-sectional view of the vehicle headlight taken along line A-A of FIG. 9B, and FIG. 9B being a front view thereof.
Figure 9B:
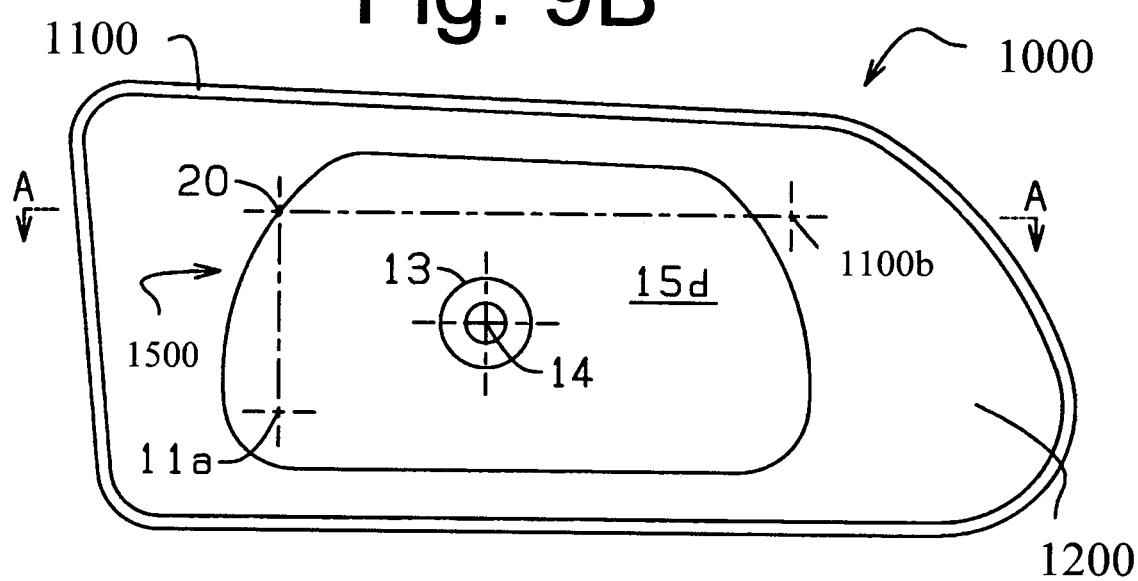
Figure 10A:
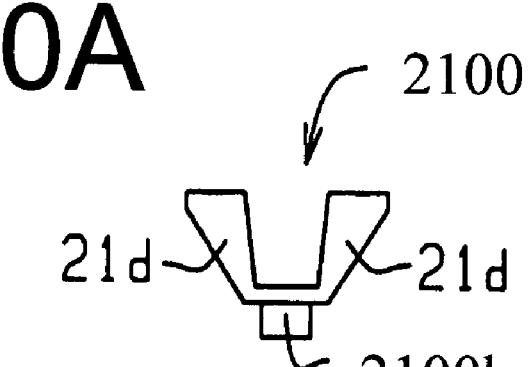
FIGS. 10A, 10B, and 10C show a support member for use in the optical axis adjusting apparatus of FIG. 9B, FIG. 10A being a plan view thereof, FIG. 10B being a front view thereof, and FIG. 10C being a cross-sectional view taken along line B-B of FIG. 10B.
Figure 10B:
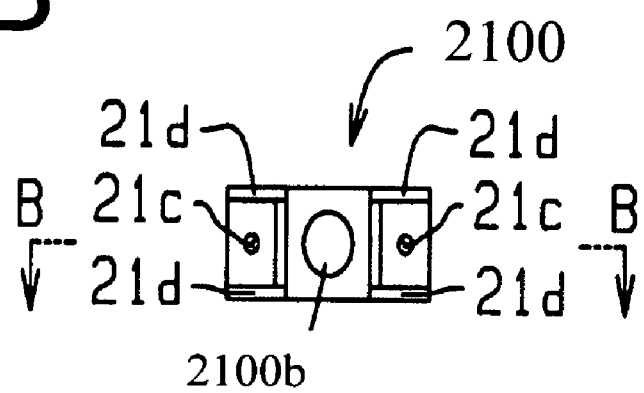
Figure 10C:
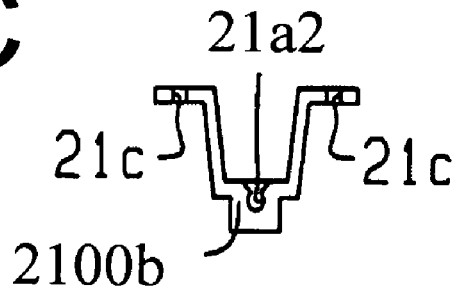

FIGS. 9A and 9B show a vehicle headlight to which an optical axis adjusting apparatus according to a third exemplary embodiment of the presently disclosed subject matter is applied. Specifically, FIG. 9A is a schematic horizontal cross-sectional view of the vehicle headlight taken along line A-A of FIG. 9B, and FIG. 9B is a front view of the headlight. FIGS. 10A, 10B, and 10C show a support member for use in the optical axis adjusting apparatus of FIG. 9A. Specifically, FIG. 10A is a plan view thereof, FIG. 10B is a front view thereof, and FIG. 10C is a cross-sectional view taken along line B-B of FIG. 10B.

In the optical axis adjusting apparatus of the first exemplary embodiment, as shown in FIGS. 4A to 6, the tip portion 11b2 of the aiming screw 11b can have a non-screw portion having a substantially cylindrical shape, and the support member 21 can have a fit hole 21a of a substantially cylindrical shape that is configured to fit with the cylindrical non-screw portion of the tip portion 11b2 of the aiming screw 11b. In the optical axis adjusting apparatus of the third exemplary embodiment, as shown in FIGS. 9A, 10A, 10B, and 10C, the tip portion 11b3 of the aiming screw 1100b can have a spherical portion having a substantially spherical shape, and the support member 2100 can have a fit hole 21a2 in boss 2100b that has a complementary shape corresponding to the spherical portion of the aiming screw 1100b. In the above configuration, the spherical portion of the tip portion 11b3 of the aiming screw 1100b can be press fit into the fit hole 21a2 of the support member 2100 so that a sliding fit between the spherical portion of the tip portion 11b3 of the aiming screw 1100b and the fit hole 21a2 of the support member 2100 is achieved by press fitting the spherical portion into the fit hole.

Accordingly, the optical axis adjusting apparatus of the third exemplary embodiment, as shown in FIGS. 9A, 10A, 10B, and 10C, is configured such that the spherical portion of the tip portion 11b3 of the aiming screw 1100b can be slidably moved within the fit hole 21a2 while also preventing the aiming screw 1100b from coming off the fit hole 21a2 (toward the upper portion of FIG. 9A).

In this case, the force from the nut portion 1500e of the reflector 1500 may be applied to the aiming screw 1100b to move it rearward (toward the upper portion of FIG. 9A) and in the center axis direction of the aiming screw 1100b (in the vertical direction in FIG. 9A). According to the optical axis adjusting apparatus of the third exemplary embodiment, however, using the configuration as described above can prevent the aiming screw 1100b from coming off from the lamp housing 1100 by this force from the nut portion 1500e. Accordingly, no independent mechanism for preventing the aiming screw 1100b from coming off from the lamp housing 1100 is required in addition to the support member 1200.

It should be noted that other structural configurations, including the operation and the effect of the structures can be the same as those of the first exemplary embodiment, and accordingly, a detailed description thereof is omitted here.

It should be noted that the respective exemplary embodiments can be appropriately combined with each other, as desired.

In the above exemplary embodiments, the ball joint 20 is used as a fulcrum for aiming, but the presently disclosed subject matter is not limited to such a simple pivoting structure. For example, the presently disclosed subject matter can employ a ball joint which includes a nut having a spherical outer shape and which is screwed to a bolt rotatably fixed to a lamp housing. A holder can be provided for accommodating the spherical nut and can include a concave inner surface thereof so as to fix a reflector in a swinging manner.

An optical axis adjusting apparatus made in accordance with principles of the presently disclosed subject matter can be applied to a vehicle light which includes optical axis adjustment, such as a vehicle headlight, fog lamp, and the like.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
    a lamp housing;
    a reflector; and
    an optical axis adjusting apparatus including,
        a ball joint via which the lamp housing and the reflector are connected, the ball joint extending from the reflector toward the lamp housing,
        an aiming screw configured to allow the reflector to rotate with respect to the lamp housing around the ball joint and having a root portion and a tip portion with the root portion being supported by the lamp housing so as to be freely turned with respect to the lamp housing,
        a nut portion configured to be provided on the reflector and extend at a position so as to be screwed onto the aiming screw, and
        a support member to be provided as a separate member from the lamp housing, the support member including a boss portion that includes a fit hole and is formed closer to the reflector, screw-hole portions that each include a screw hole and are formed closer to the lamp housing and provided at each side of the boss portion, connecting portions that connect the boss portion and the respective screw-hole portions at each side of the boss portion, and reinforcing ribs provided to and across the connecting portions and the screw-hole portions, the support member supporting the tip portion of the aiming screw positioned opposite to the root portion such that the tip portion can be rotated with respect to the support member, wherein the support member is attached to the lamp housing,
    wherein the tip portion of the aiming screw has a non-screw portion having a substantially cylindrical shape; and
    wherein the fit hole has a substantially cylindrical shape that fits with the cylindrical non-screw portion of the tip portion of the aiming screw so that a sliding fit between the non-screw portion of the tip portion of the aiming screw and the fit hole of the support member is achieved.

2. The vehicle light according to claim 1, wherein the aiming screw is positioned outside a vertical plane in which the ball joint is positioned.

3. The vehicle light according to claim 1, wherein the vehicle light is a vehicle headlight whose optical axis is adjustable.

4. An optical axis adjusting apparatus and vehicle light, the vehicle light including a lamp housing and a reflector having a front surface and a rear surface, the optical axis adjusting apparatus comprising:
    a ball joint via which the lamp housing and the reflector are connected, the ball joint extending from the rear surface of the reflector toward the lamp housing;
    an aiming screw allowing the reflector to rotate with respect to the lamp housing around the ball joint and having a root portion and a tip portion with the root portion being supported by the lamp housing so as to be freely turned with respect to the lamp housing;
    a nut portion provided on the rear surface of the reflector and extend at a position so as to be screwed onto the aiming screw; and
    a support member provided as a separate member from the lamp housing, the support member including a boss portion that includes a fit hole and is formed closer to the reflector, screw-hole portions that each include a screw hole and are formed closer to the lamp housing and provided at each side of the boss portion, connecting portions that connect the boss portion and the respective screw-hole portions at each side of the boss portion, and reinforcing ribs provided to and across the connecting portions and the screw-hole portions, the support member supporting the tip portion of the aiming screw positioned opposite to the root portion such that the tip portion can be rotated with respect to the support member, wherein the support member is attached to the lamp housing,
    wherein the tip portion of the aiming screw has a non-screw portion having a substantially cylindrical shape; and
    wherein the fit hole has a substantially cylindrical shape that fits with the cylindrical non-screw portion of the tip portion of the aiming screw so that a sliding fit between the non-screw portion of the tip portion of the aiming screw and the fit hole of the support member is achieved.

5. The optical axis adjusting apparatus according to claim 1, wherein the aiming screw is positioned outside a vertical plane in which the ball joint is positioned.

6. The optical axis adjusting apparatus according to claim 1, wherein the vehicle light is a vehicle headlight whose optical axis is adjustable.

7. An optical axis adjusting apparatus and vehicle light, the vehicle light including a lamp housing and a reflector having a front surface and a rear surface, the optical axis adjusting apparatus comprising:
    a ball joint via which the lamp housing and the reflector are connected, the ball joint extending from the rear surface of the reflector toward the lamp housing;
    an aiming screw allowing the reflector to rotate with respect to the lamp housing around the ball joint and having a root portion and a tip portion with the root portion being supported by the lamp housing so as to be freely turned with respect to the lamp housing;

a nut portion provided on the rear surface of the reflector and extend at a position so as to be screwed onto the aiming screw; and a support member provided as a separate member from the lamp housing, the support member including a boss portion that includes a fit hole and is formed closer to the reflector, screw-hole portions that each include a screw hole and are formed closer to the lamp housing and provided at each side of the boss portion, connecting portions that connect the boss portion and the respective screw-hole portions at each side of the boss portion, and reinforcing ribs provided to and across the connecting portions and the screw-hole portions, the support member supporting the tip portion of the aiming screw positioned opposite to the root portion such that the tip portion can be rotated with respect to the support member, wherein the support member is attached to the lamp housing, the tip portion of the aiming screw has a spherical portion having a substantially spherical shape; and the fit hole having a complementary shape corresponding to the spherical portion of the tip portion of the aiming screw, and the spherical portion is fit into the complementary shape such that a sliding fit between the spherical portion of the tip portion of the aiming screw and the fit hole of the support member is achieved.

8. The vehicle light according to claim 7, wherein the aiming screw is positioned outside a vertical plane in which the ball joint is positioned.

9. The vehicle light according to claim 7, wherein the vehicle light is a vehicle headlight whose optical axis is adjustable.

10. An optical axis adjusting apparatus and vehicle light, the vehicle light including a lamp housing and a reflector having a front surface and a rear surface, the optical axis adjusting apparatus comprising:

a ball joint via which the lamp housing and the reflector are connected, the ball joint extending from the rear surface of the reflector toward the lamp housing;

an aiming screw allowing the reflector to rotate with respect to the lamp housing around the ball joint and having a root portion and a tip portion with the root portion being supported by the lamp housing so as to be freely turned with respect to the lamp housing;

a nut portion provided on the rear surface of the reflector and extend at a position so as to be screwed onto the aiming screw; and a support member provided as a separate member from the lamp housing, the support member including a boss portion that includes a fit hole and is formed closer to the reflector, screw-hole portions that each include a screw hole and are formed closer to the lamp housing and provided at each side of the boss portion, connecting portions that connect the boss portion and the respective screw-hole portions at each side of the boss portion, and reinforcing ribs provided to and across the connecting portions and the screw-hole portions, the support member supporting the tip portion of the aiming screw positioned opposite to the root portion such that the tip portion can be rotated with respect to the support member, wherein the support member is attached to the lamp housing, wherein the tip portion of the aiming screw has a spherical portion having a substantially spherical shape; and wherein the fit hole has a complementary shape corresponding to the spherical portion of the tip portion of the aiming screw, and the spherical portion is fit into the complimentary shape of the fit hole such that a sliding fit between the spherical portion of the tip portion of the aiming screw and the fit hole of the support member is achieved.

11. The optical axis adjusting apparatus according to claim 10, wherein the aiming screw is positioned outside a vertical plane in which the ball joint is positioned.

\* \* \* \* \*